US008102926B2

(12) United States Patent
Mantravadi et al.

(10) Patent No.: US 8,102,926 B2
(45) Date of Patent: Jan. 24, 2012

(54) METHOD AND APPARATUS FOR COMMUNICATION IN A SYSTEM EMPLOYING DIFFERING TRANSMISSION PROTOCOLS

(75) Inventors: Ashok Mantravadi, San Diego, CA (US); Durga Prasad Malladi, San Diego, CA (US); Avneesh Agrawal, San Diego, CA (US); Anastasios Stamoulis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 853 days.

(21) Appl. No.: 11/234,723

(22) Filed: Sep. 23, 2005

(65) Prior Publication Data

US 2006/0067206 A1    Mar. 30, 2006

Related U.S. Application Data

(60) Provisional application No. 60/612,679, filed on Sep. 24, 2004.

(51) Int. Cl.
*H04K 1/10* (2006.01)
*H04L 27/28* (2006.01)

(52) U.S. Cl. ........................................ 375/260; 375/138
(58) Field of Classification Search .................. 375/138, 375/260
See application file for complete search history.

(56) References Cited

U.S. PATENT DOCUMENTS

| 5,936,965 | A | 8/1999 | Doshi et al. .................. 370/469 |
| 6,888,789 | B1 | 5/2005 | Sakoda et al. | |
| 7,042,957 | B1 * | 5/2006 | Zirwas .......................... 375/295 |
| 7,283,498 | B2 * | 10/2007 | Ro et al. ........................ 370/333 |
| 7,548,587 | B2 | 6/2009 | Zhang | |
| 2005/0276254 | A1 * | 12/2005 | Zhang ........................... 370/343 |
| 2006/0039344 | A1 * | 2/2006 | Khan ............................ 370/345 |
| 2007/0121706 | A1 * | 5/2007 | Nakamura et al. ............ 375/141 |

FOREIGN PATENT DOCUMENTS

| AU | 2005207338 | 8/2005 |
| EP | 0963071 | 12/1999 |
| JP | 11284597 | 10/1999 |
| JP | 2001339363 | 12/2001 |
| JP | 2003158499 | 5/2003 |
| SU | 1133673 | 1/1985 |
| SU | 1356228 | 11/1987 |
| WO | 2004013987 | 2/2004 |
| WO | WO2004056052 | 7/2004 |
| WO | 2005071867 | 8/2005 |

OTHER PUBLICATIONS

International Preliminary Report on Patentability-PCT/US2005/034048—The International Bureau of WIPO—Mar. 27, 2007.
Written Opinion—PCT/US2005/034048—European Patent Office—Jan. 20, 2006.
International Search Report—PCT/US2005/034048—European Patent Office—Jan. 20, 2006.

* cited by examiner

*Primary Examiner* — Chieh M Fan
*Assistant Examiner* — Freshteh N Aghdam
(74) *Attorney, Agent, or Firm* — Howard H. Seo (57) ABSTRACT

A method and apparatus for communication in a system employing differing transmission protocols. It is determined whether a first time slot of one transmission protocol is adjacent to a second time slot of another transmission protocol, and if a first symbol within the first time slot is adjacent to a second symbol of the second time slot. A pilot power and/or a number of pilot sub-carriers or tones of the first symbol is increased and channel estimation is performed on the first symbol.

20 Claims, 5 Drawing Sheets

METHOD AND APPARATUS FOR COMMUNICATION IN A SYSTEM EMPLOYING DIFFERING TRANSMISSION PROTOCOLS

CLAIM OF PRIORITY UNDER 35 U.S.C. §119

This application claims priority to U.S. Provisional Application No. 60/612,679 filed Sep. 24, 2004, entitled "OFDM Pilot Structure for TDM Overlaid Systems," and assigned to the assignee hereof and hereby expressly incorporated by reference herein.

BACKGROUND

1. Field

The present invention relates generally to communication systems, and more specifically, to a method and apparatus for communication in a wireless communication system employing differing transmission protocols.

2. Background

Wireless communication technologies have seen explosive growth over the past few years. This growth has been primarily fueled by wireless services providing freedom of movement to the communicating public as opposed to being "tethered" to a hard-wired communication system. It has also been fueled by the increasing quality and speed of voice and data communications over the wireless medium, among other factors. As a result of these enhancements in the communications field, wireless communications has had, and will continue to have, a significant impact on a growing number of the communicating public.

Wireless communication systems are widely deployed to provide various communication services such as voice, packet data, multi-media broadcast, text messaging, and so on. These systems may be multiple-access systems capable of supporting communication for multiple users by sharing the available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems. A CDMA system may implement a radio access technology (RAT) such as Wideband CDMA (W-CDMA), cdma2000, and so on. RAT refers to the technology used for over-the-air communication. W-CDMA is described in documents from a consortium named "3rd Generation Partnership Project" (3GPP). cdma2000 is described in documents from a consortium named "3rd Generation Partnership Project 2" (3GPP2). 3GPP and 3GPP2 documents are publicly available.

Communication performed within the wireless communication system may be accomplished via a unicast transmission and/or via a broadcast transmission through an Enhanced Multimedia Broadcast/Multicast Communication Service (E-MBMS) in a time division multiplex (TDM) slotted mode, for example. A unicast transmission is defined as a communication that is transmitted from one single point to another single point (e.g., from one transmitter to one receiver); whereas a broadcast transmission is defined as a communication that is transmitted from one point to multiple other points (e.g., from one transmitter to multiple receivers).

When performing channel estimation in a receiver for coherent demodulation, typically the pilots present in the one or two symbols occurring prior to and the one or two symbols occurring after the symbol being analyzed for channel estimation are also analyzed to provide for a more accurate channel estimation. Accordingly, the channel estimation is performed by averaging the analysis of the pilots over three to five symbols (i.e., the symbol under analysis and the one or two symbols preceding and one or two symbols following the symbol under analysis). However, the effective delay spread of a single frequency network (SFN) broadcast channel is much larger than a unicast channel and the required number of FDM pilot tones increases as the delay spread of the channel increases. Accordingly, because the number of pilot tones used for a broadcast transmission is much greater than the number of pilot tones used for a unicast transmission, channel estimation may be significantly degraded when a symbol from a broadcast transmission slot is adjacent to a symbol from a unicast transmission slot.

The present invention is directed to overcoming, or at least reducing the effects of, one or more problems indicated above.

SUMMARY

In one embodiment, a method in a wireless communication system is provided. The method comprises determining whether a first time slot of one transmission protocol is adjacent to a second time slot of another transmission protocol, and determining a first symbol within the first time slot that is adjacent to a second symbol of the second time slot. The method further comprises increasing a pilot power and/or a number of pilot tones of the first symbol and performing channel estimation on the first symbol.

In another embodiment, an apparatus in a wireless communication system is provided. The apparatus comprises means for determining whether a first time slot of one transmission protocol is adjacent to a second time slot of another transmission protocol, and means for determining a first symbol within the first time slot that is adjacent to a second symbol of the second time slot. The apparatus further comprises means for increasing a pilot power and/or a number of pilot tones of the first symbol and means for performing channel estimation on the first symbol.

In another embodiment, a communication device in a wireless communication system is provided. The device comprises a receiver for receiving a signal, and a processor for determining whether a first time slot of one transmission protocol is adjacent to a second time slot of another transmission protocol of the signal. The processor further determines a first symbol within the first time slot that is adjacent to a second symbol of the second time slot, increases a pilot power and/or a number of pilot tones of the first symbol, and performs channel estimation on the first symbol.

In yet another embodiment, a computer readable media programmed with a set of instructions executable on a processor is provided. The computer readable media is programmed to perform determining whether a first time slot of one transmission protocol is adjacent to a second time slot of another transmission protocol, and determining a first symbol within the first time slot that is adjacent to a second symbol of the second time slot. The media is also programmed to perform increasing a pilot power and/or a number of pilot tones of the first symbol, and performing channel estimation on the first symbol.

DETAILED DESCRIPTION

Figure 1:
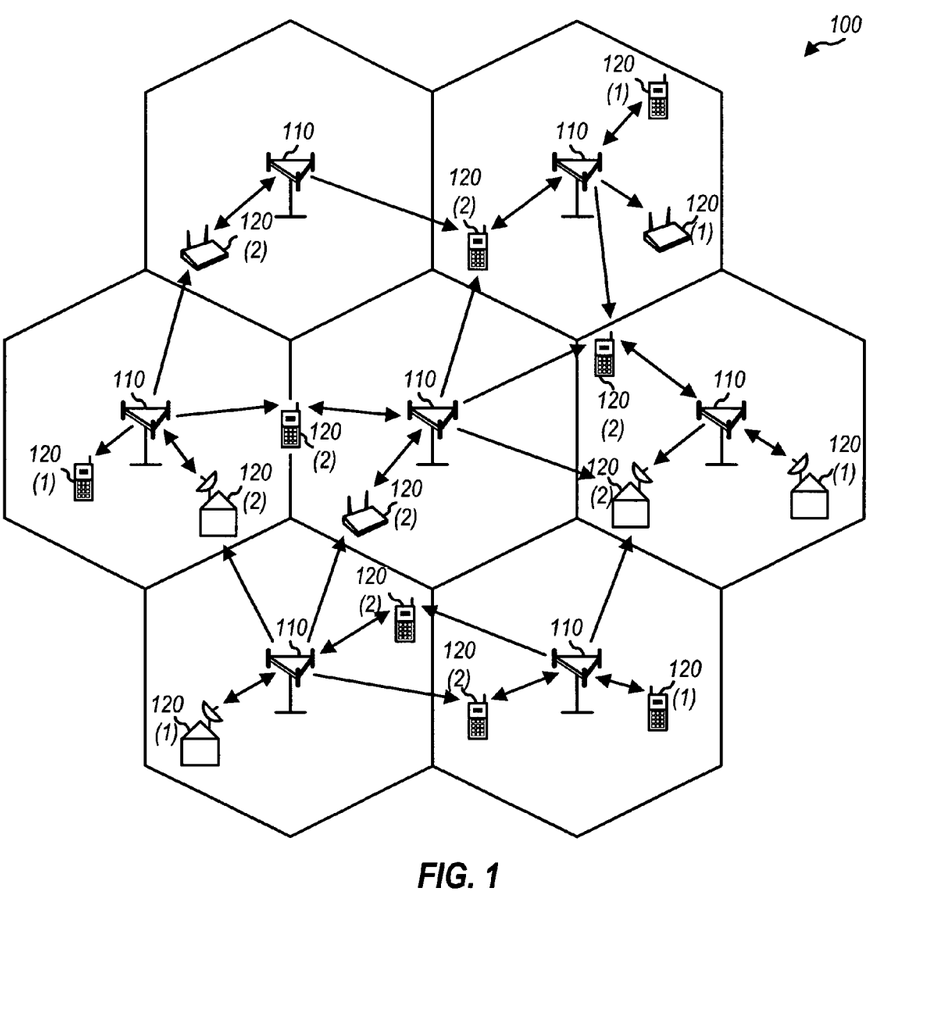
FIG. 1 is a block diagram of a wireless communication system in accordance with one exemplary embodiment.

FIG. 1 illustrates a wireless communication system 100 that includes a plurality of base stations 110 that communicate with a plurality of mobile terminals 120. A base station is generally a fixed station that communicates with the terminals and may also be called an access point, Node B, base transceiver subsystem (BTS), or some other terminology. Each base station 110 provides communication coverage for a particular geographic area. The term "cell" may refer to a base station and/or its coverage area depending on the context in which the term is used. To improve system capacity, the base station coverage area may be partitioned into multiple smaller areas. Each smaller area is served by a respective BTS. The term "sector" can refer to a BTS and/or its coverage area depending on the context in which the term is used. For simplicity, in the following description, the term "base station" is used generically for both a fixed station that serves a cell and a fixed station that serves a sector.

Mobile terminals 120 may be dispersed throughout the wireless communication system 100 for communicating therein. The mobile terminals 120 may, for example, take the form of wireless telephones, personal information managers (PIMs), personal digital assistants (PDAs), a laptop computer or any other device that is configured for wireless communication. The mobile terminals may also be referred to as a mobile station, wireless device, user equipment (UE), user terminal, subscriber unit, or some other terminology. The terms "terminal" and "user" may be used interchangeably herein. It will further be appreciated that the terminal 120 need not necessarily be mobile, but may also be provided in the form of a fixed terminal that is configured for wireless transmission.

The mobile terminal 120 may communicate with zero, one, or multiple base stations 110 at any given moment. The mobile terminal 120 may also communicate with the base station 110 on the downlink and/or uplink. The downlink (or forward link) refers to the communication link from the base station 110 to the mobile terminal 120, and the uplink (or reverse link) refers to the communication link from the mobile terminal 120 to the base station 110.

According to one embodiment, some of the mobile terminals 120 communicate in the wireless communication system 100 in accordance with a unicast transmission scheme (hereinafter referred to as unicast terminals 120(1)) and some of the mobile terminals 120 communicate in accordance with an Enhanced Multimedia Broadcast/Multicast Service (E-MBMS) transmission scheme (hereinafter referred to as broadcast terminals 120(2)). As defined herein, unicast is a communication that is transmitted from one single point to another single point (e.g., from one transmitter to one receiver); whereas broadcast is a communication that is transmitted from one point to multiple other points (e.g., from one transmitter to multiple receivers). The base stations 110 may communicate with the broadcast terminals 120(2) in accordance with a Single Frequency Network (SFN) broadcast protocol, for example.

In one embodiment, the unicast terminals 120(1) and the broadcast terminals 120(2) may communicate in accordance with an Orthogonal Frequency Division Multiplexing (OFDM) communication protocol. It will be appreciated, however, that the unicast and broadcast terminals 120 may communicate via any one of a number of multiple access communication protocols including, but not necessarily limited to, Code Division Multiple Access (CDMA), Wideband CDMA (W-CDMA), Time Division Multiple Access (TDMA), Frequency Division Multiple Access (FDMA), etc. Communication with the unicast terminals 120(1) and the broadcast terminals 120(2) and the wireless communication system 100 is performed in a slotted time division multiplex (TDM) mode, wherein the communication channel is shared between the unicast and broadcast terminals 120 by communicating in different time slots.

Figure 2:
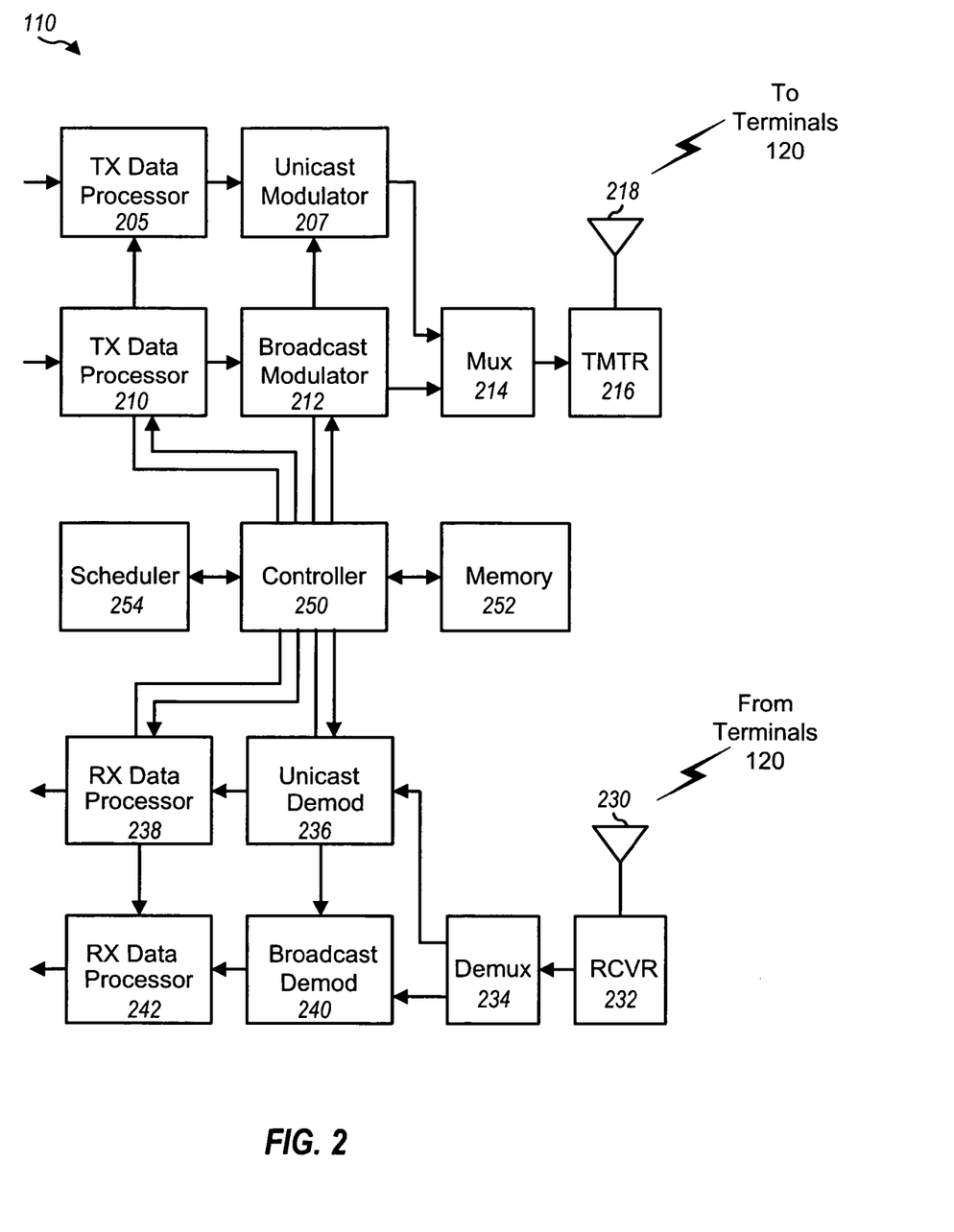
FIG. 2 shows a more detailed representation of a base station of the wireless communication system of FIG. 1.

FIG. 2 is a block diagram illustrating an embodiment of the base station 110 within the wireless communication system 100. At base station 110, an OFDM transmit data processor 205 receives and processes data to be transmitted to the unicast terminals 120(1) using OFDM and generates data and pilot symbols. A unicast modulator 207 performs OFDM modulation on the data and pilot symbols, generates OFDM symbols, and forms an OFDM waveform for each unicast slot. As mentioned, transmission to the unicast terminals 120(1) is performed via an OFDM communication protocol in the exemplary embodiment; however, it will be appreciated that various other multiple-access communication protocols (as previously mentioned) may be used in lieu of the aforementioned communication protocol for transmission of data to the unicast terminals 120(1).

An OFDM transmit data processor 210 receives and processes data to be transmitted to the broadcast terminals 120(2) using OFDM and generates data and pilot symbols. A broadcast modulator 212 performs OFDM modulation on the data and pilot symbols, generates OFDM symbols, and forms an OFDM waveform for each E-MBMS slot. A multiplexer (Mux) 214 multiplexes the generated OFDM unicast waveforms from unicast modulator 207 onto unicast slots, multiplexes OFDM broadcast waveforms generated by broadcast modulator 212 onto E-MBMS slots, and provides an output signal to transmitter unit 216. The transmitter unit (TMTR) 216 conditions (e.g., converts to analog, filters, amplifies, and frequency upconverts) the output signal from multiplexer 214 and generates a modulated signal that is transmitted from an antenna 218 to the mobile terminals 120 that communicate within the wireless communication system 100.

An antenna 230 receives a modulated signal transmitted by the mobile terminals 120 and provides a received signal to a receiver unit (RCVR) 232. Receiver unit 232 conditions, digitizes, and processes the received signal and provides a stream of samples to a demultiplexer (Demux) 234. Demultiplexer 234 provides samples in unicast slots to a unicast demodulator (Demod) 236 and samples in E-MBMS slots to a broadcast demodulator 240. Unicast demodulator 236 performs OFDM demodulation on the received samples and provides data symbol estimates. An OFDM receive (RX) data processor 238 processes the data symbol estimates and provides decoded data. Broadcast demodulator 240 performs OFDM demodulation on the received samples and provides data symbol estimates. An OFDM receive (RX) data processor 242 processes the data symbol estimates and provides decoded data.

Controller 250 controls various operating functions of the base station 110. Memory unit 252 stores program codes and data used by controller 250. Controller 250 and/or a scheduler 254 allocates time slots for the downlink and uplink, determines whether to use unicast or broadcast for each time slot, and allocates time slots to E-MBMS physical channels.

Figure 3:
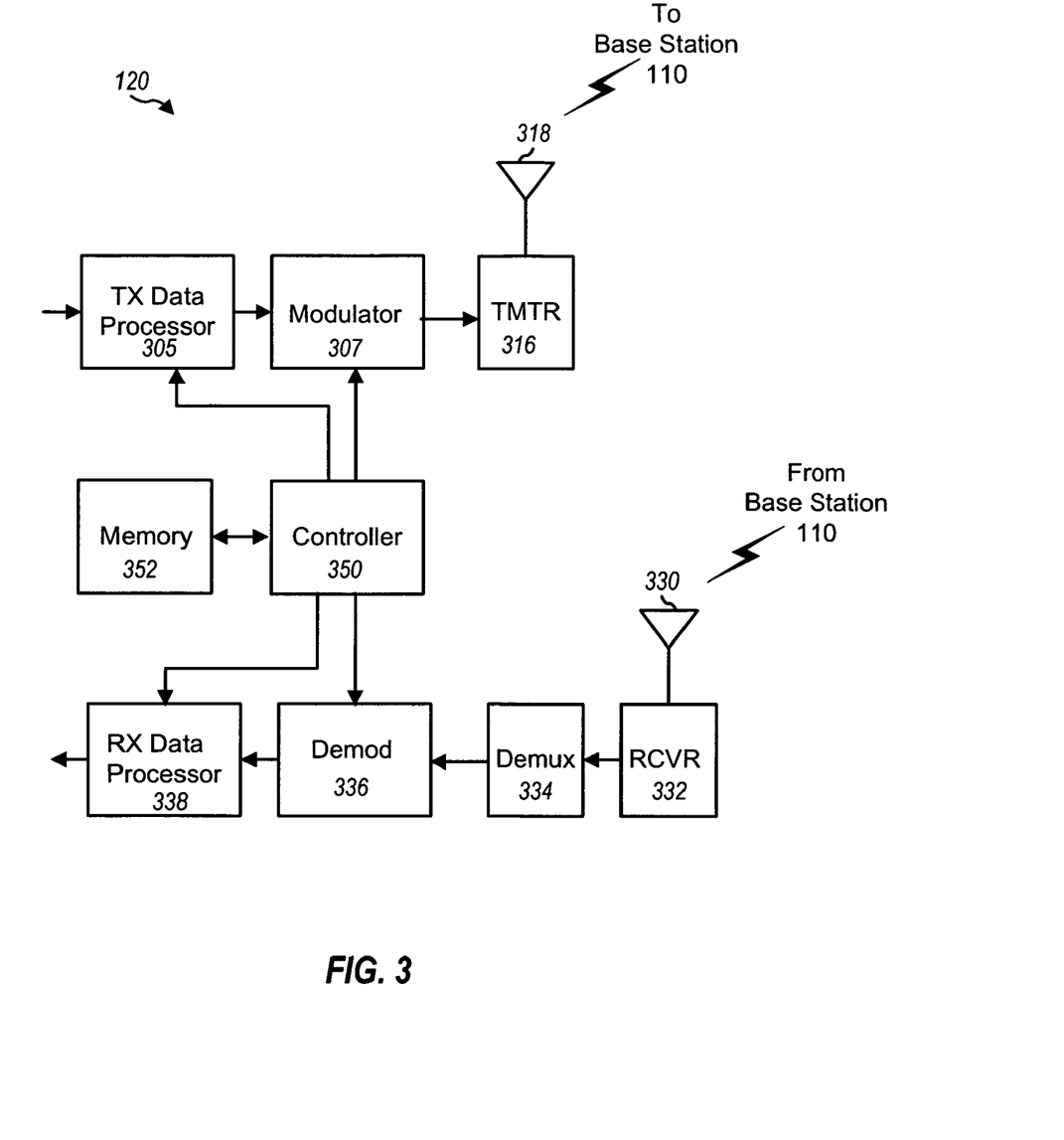
FIG. 3 is a more detailed representation of a mobile terminal communicating within the wireless communication system of FIG. 1.

FIG. 3 is a block diagram illustrating an embodiment of the mobile terminal 120 within the wireless communication system 100. A common block diagram is used to represent both the unicast and broadcast terminals 120 for simplicity sake. At mobile terminal 120, a transmit data processor 305 processes data in accordance with an OFDM communication protocol and generates data and pilot symbols for transmission to the base station 110. A modulator 307 for the mobile terminal 120 performs OFDM modulation on the data and pilot symbols, generates OFDM symbols, and forms an OFDM waveform and provides an output signal to a transmitter unit (TMTR) 316, which is transmitted from an antenna 318 to the base station 110 on the uplink. In an alternative embodiment, the transmission circuitry (i.e., elements 305-318) may be omitted from the mobile terminal 120 such that the terminal 120 may be configured as a receiver device.

An antenna 330 receives a modulated signal transmitted by the base station 110 on the downlink and provides a received signal to a receiver unit (RCVR) 332. Receiver unit 332 conditions, digitizes, and processes the received signal and provides a stream of samples to a demultiplexer (Demux) 334. Demultiplexer 334 provides samples in E-MBMS slots or the unicast time slots to an OFDM demodulator 336. OFDM demodulator 336 performs OFDM demodulation on the received samples and provides data symbol estimates. An OFDM receive (RX) data processor 338 processes the data symbol estimates and provides decoded data. Controller 350 controls various operating functions of the mobile terminal 120 and memory unit 352 stores program codes and data used by controller 350. As previously mentioned, the unicast terminals 120(1) and broadcast terminals 120(2) may be alternatively configured to communicate via various other multiple access communication protocols, and, thus, need not necessarily be limited to OFDM as provided for in the exemplary embodiment.

When performing channel estimation for coherent demodulation in a receiver, a problem typically exists when there are two distinct types of users communicating via differing communication protocols, such as the unicast terminals 120(1) and the broadcast terminals 120(2), for example. When performing channel estimation, typically the pilots present in the one or two symbols occurring prior to and the one or two symbols occurring after the symbol being analyzed for channel estimation are also analyzed to provide for a more accurate channel estimation. Accordingly, the channel estimation is performed by averaging the analysis of the pilots over three to five symbols (i.e., the symbol under analysis and the one or two symbols preceding and one or two symbols following the symbol under analysis).

Figure 4A:
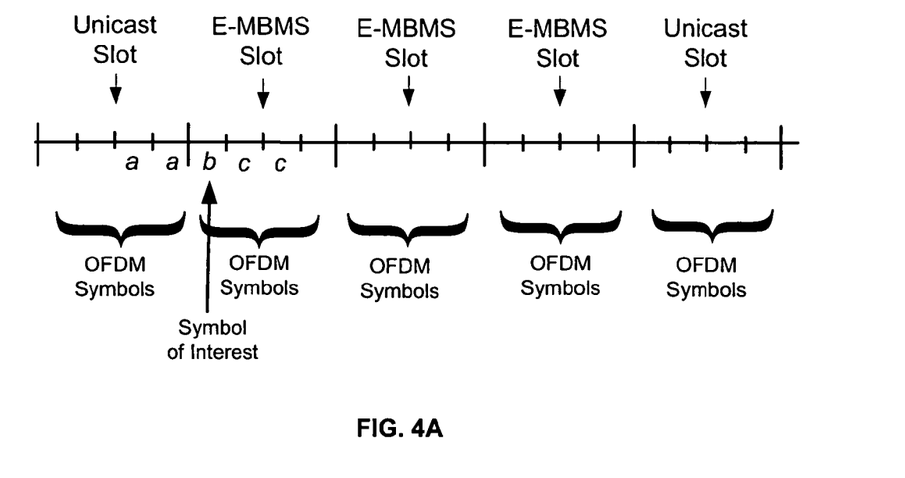
FIGS. 4A and 4B provide a representation of a time division multiplexed communication with time slots allocated to unicast and E-MBMS transmissions.

FIG. 4A illustrates a TDM communication between the base station 110 and mobile terminals 120 with time slots allocated to unicast and E-MBMS transmissions in accordance with one exemplary embodiment. In this particular example, the first and fifth time slots are occupied by a unicast transmission and the second, third, and fourth time slots are occupied by an E-MBMS transmission. In accordance with the exemplary embodiment, the E-MBMS transmission slots include four OFDM symbols for broadcast transmission and the unicast transmission slots include four OFDM symbols for unicast transmission. As previously mentioned, however, the particular communication protocol utilized for the unicast or E-MBMS transmission need not necessarily be limited to OFDM, but may include various other forms of communication protocols.

Referring to the example of FIG. 4A, if the first symbol of the E-MBMS transmission slot is considered a symbol of interest (e.g., symbol "b") for purposes of channel estimation, it is desirable to also consider the two symbols preceding (designated by symbols "a") and the two symbols following (designated by symbols "c") the symbol of interest "b" for a more accurate channel estimation. Because the symbols "c" (following the symbol "b") are also symbols of a broadcast transmission, the number of pilot tones within symbols "c" provide for a meaningful comparison with the number of pilot tones present in symbol "b" for purposes of channel estimation. However, because the two preceding symbols "a" are from a unicast transmission, the number of pilot tones are proportionally much smaller than the number of pilot tones present in the symbols of the broadcast transmission (i.e., symbols "b" and "c"). As mentioned, this results because the number of pilot tones used for a broadcast communication is much greater than the number of pilot tones used for a unicast transmission. Accordingly, because of the large disparity between the number of pilot tones for a broadcast symbol and a unicast symbol exists, channel estimation may be significantly degraded when a symbol from an E-MBMS transmission slot is adjacent to a symbol from a unicast transmission slot.

A solution to this problem may be to increase the number of pilots within the symbols. For example, if the number of pilot tones ($N_{pilot}$) is 128 and the number of data tones ($N_{data}$) is 896 for a total number ($N_{total}$) of data and pilot tones of 1,024 for a particular symbol, then the number of pilot tones $N_{pilot}$ could be increased to 256; however, at the expense of decreasing the number of data tones ($N_{data}$) to 768 to achieve the total number of data and pilot tones ($N_{total}$) of 1,024 for the symbol. Accordingly, when the number of pilot tones ($N_{pilot}$) are increased, the number of data tones ($N_{data}$) within the symbol are undesirably decreased, thereby causing a decrease in the overall data transmission rate between the base station 110 and the mobile terminal 120.

Figure 4B:
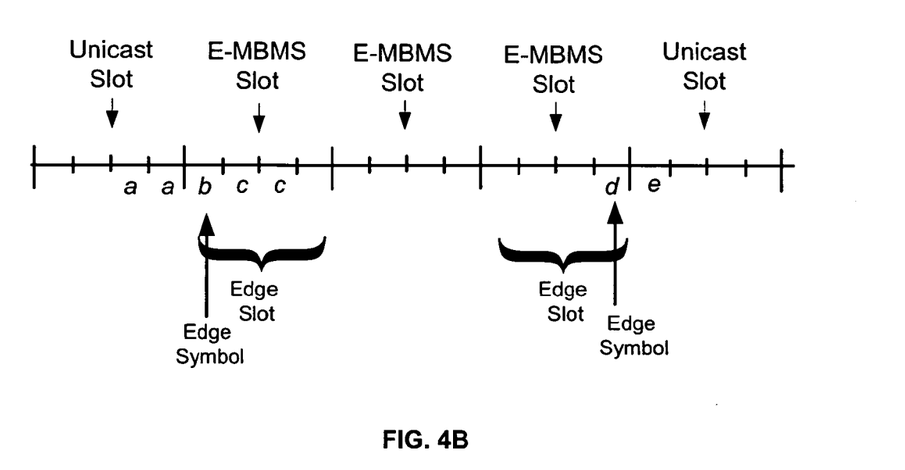

In accordance with one embodiment, the pilot power and/or the number of FDM pilot sub-carriers (or tones) is increased for only an edge symbol of an E-MBMS edge slot for purposes of channel estimation using the edge symbol. Referring to FIG. 4B, the second time slot of the E-MBMS transmission is considered an "edge" slot because it is adjacent to the first time slot of a unicast transmission. The E-MBMS symbol "b" is considered an edge symbol because the preceding symbol is a unicast symbol "a" from the unicast transmission in the first slot. Similarly, E-MBMS symbol "d" within the fourth slot of the E-MBMS transmission is considered an edge symbol because symbol "e" is a unicast symbol within the fifth slot of the unicast transmission that is adjacent to the E-MBMS symbol "d." The pilot power and/or number of pilot sub-carriers or tones is increased for channel estimation using edge symbols of the edge slots thereby permitting a more accurate channel estimation and, at the same time, conserving the data rate for transmission as much as possible. In one embodiment, the amount of increase in the pilot power and/or the number of pilot tones may be configurable within the wireless communication system 100 and/or set by a pre-defined amount. It will further be appreciated that the amount of increase in the pilot power and/or pilot tones may be stored at the mobile terminal 120 within memory 352, for example, and this information may be transmitted to the mobile terminal 120 from the base station 110.

Figure 5:
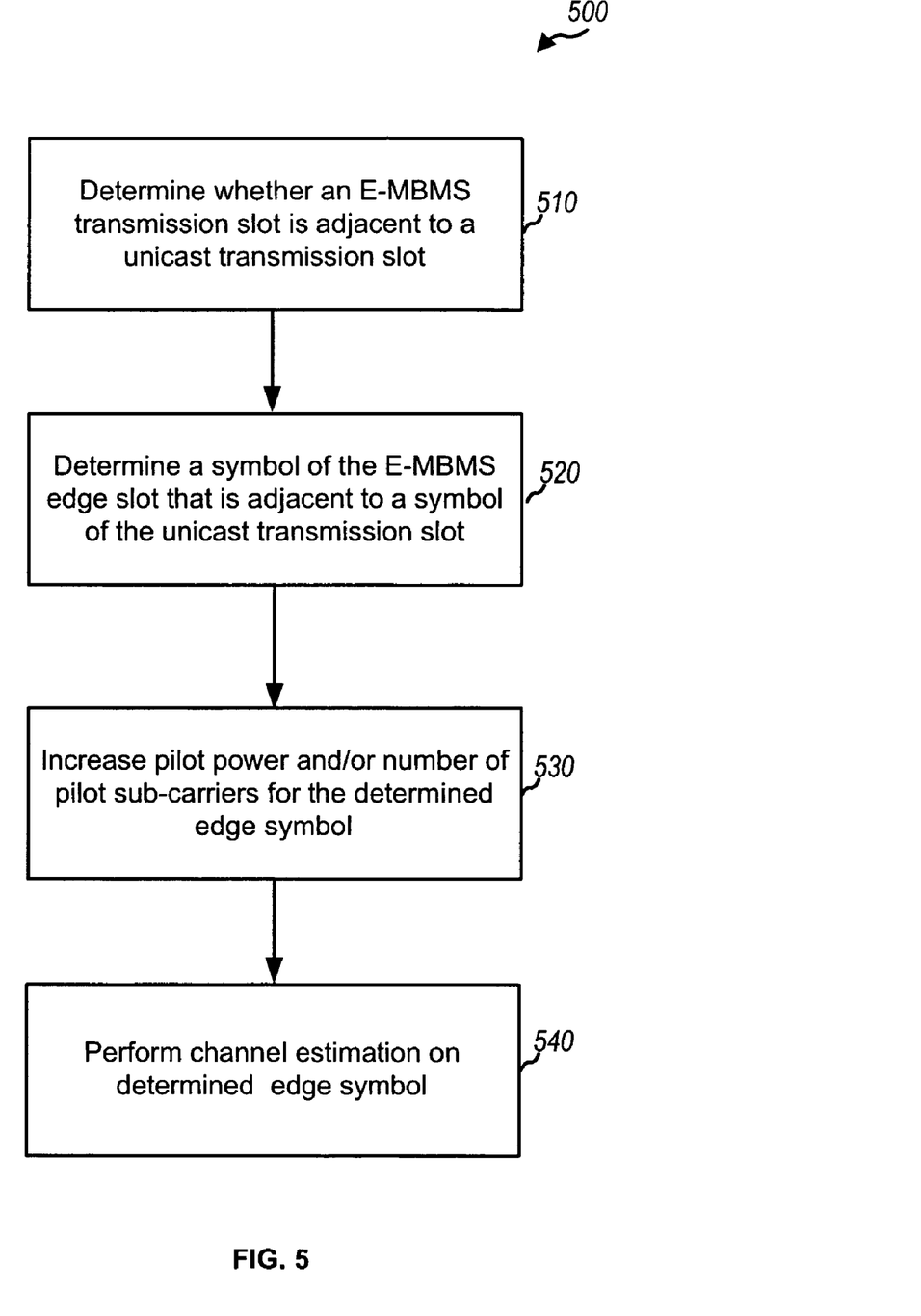
FIG. 5 is a flow diagram illustrating a process for increasing the pilot power and/or the number of pilot sub-carriers or tones for channel estimation in accordance with the exemplary embodiment.

Referring to FIG. 5, a process 500 for increasing the pilot power and/or the number of pilot sub-carriers or tones for channel estimation is shown in accordance with one exemplary embodiment. At block 510, it is determined whether a broadcast (E-MBMS) transmission in a given time slot is adjacent to a time slot having a unicast transmission (i.e., it is determined whether the E-MBMS transmission occurs within an edge slot). At block 520, it is then determined which E-MBMS symbol of the edge slot is adjacent to the unicast symbol of a unicast transmission. It will be appreciated that the determination of such edge slots and edge symbols may be carried out in accordance with methods that are well-established to those of ordinary skill in the art.

At block 530, the pilot power and/or the number of pilot sub-carriers or tones for the edge symbol (determined in block 520) are increased. In one embodiment, the amount of increase in the pilot power and/or the number of pilot tones may be configurable within the wireless communication system 100 and/or set by a pre-defined amount. It will further be appreciated that the amount of increase in the pilot power and/or pilot tones may be stored at the mobile terminal 120 within memory 352, for example.

At block 540, channel estimation is then performed on the edge symbol using the increased pilot power and/or increased number of pilot sub-carriers or tones of the edge symbol. It will be appreciated that the channel estimation may be performed in accordance with methods well-established to those of ordinary skill in the art.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method in a wireless communication system, comprising:
    determining, by at least one communication device of the wireless communication system, whether a first time slot of one transmission protocol is adjacent to a second time slot of another transmission protocol; and
    when the first time slot of one transmission protocol is adjacent to a second time slot of the another transmission protocol,
        determining, by the at least one communication device, a first symbol within the first time slot that is adjacent to a second symbol of the second time slot; and
        increasing the at least one communication device, a pilot power of the first symbol while retaining a pilot power of the second symbol and other symbols within the first time slot.

2. The method of claim 1, wherein said determining whether a first time slot of one transmission protocol is adjacent to a second time slot of another transmission protocol further comprises:
    determining whether a first time slot of a broadcast transmission is adjacent to a second time slot of a unicast transmission.

3. The method of claim 2, wherein the broadcast transmission comprises an Enhanced Multimedia Broadcast/Multicast Service (E-MBMS) transmission.

4. The method of claim 1, wherein said first and second symbol comprise an Orthogonal Frequency Division Multiplexing (OFDM) symbol.

5. An apparatus in a wireless communication system, comprising:
    means for determining whether a first time slot of one transmission protocol is adjacent to a second time slot of another transmission protocol; and
    means for when the first time slot of one transmission protocol is adjacent to a second time slot of the another transmission protocol,
        determining a first symbol within the first time slot that is adjacent to a second symbol of the second time slot;

increasing a pilot power of the first symbol while retaining a pilot power of the second symbol and other symbols within the first time slot.

6. The apparatus of claim 5, further comprising:
means for increasing a number of pilot sub-carriers for the first symbol in lieu of increasing the pilot power of the first symbol.

7. The apparatus of claim 5, wherein said means for determining whether a first time slot of one transmission protocol is adjacent to a second time slot of another transmission protocol further comprises:
means for determining whether a first time slot of a broadcast transmission is adjacent to a second time slot of a unicast transmission.

8. The apparatus of claim 7, wherein the broadcast transmission comprises an Enhanced Multimedia Broadcast/Multicast Service (E-MBMS) transmission.

9. The apparatus of claim 5, wherein said first and second symbol comprise an Orthogonal Frequency Division Multiplexing (OFDM) symbol.

10. A communication device in a wireless communication system, comprising:
a receiver configured to receive a signal; and
a processor configured to:
determine whether a first time slot of one transmission protocol is adjacent to a second time slot of another transmission protocol of the signal, when the first time slot of one transmission protocol is adjacent to a second time slot of the another transmission protocol,
determine a first symbol within the first time slot that is adjacent to a second symbol of the second time slot, the pilot power of the first symbol being increased while retaining a pilot power of the second symbol and other symbols within the first time slot, and
perform channel estimation on the first symbol having an increased pilot power by averaging pilots of at least the first symbol and at least one other symbol within the first time slot.

11. The communication device of claim 10, wherein a number of pilot sub-carriers for the first symbol is increased in lieu of increasing the pilot power of the first symbol.

12. The communication device of claim 10, wherein the one transmission protocol is a broadcast transmission and the another transmission protocol is a unicast transmission.

13. The communication device of claim 12, wherein the broadcast transmission comprises an Enhanced Multimedia Broadcast/Multicast Service (E-MBMS) transmission.

14. The communication device of claim 10, wherein said first and second symbol comprise an Orthogonal Frequency Division Multiplexing (OFDM) symbol.

15. A non-transitory computer readable media programmed with a set of instructions executable on a processor to perform:
determining whether a first time slot of one transmission protocol is adjacent to a second time slot of another transmission protocol; and
when the first time slot of one transmission protocol is adjacent to a second time slot of the another transmission protocol,
determining a first symbol within the first time slot that is adjacent to a second symbol of the second time slot;
increasing a pilot power of the first symbol while retaining a pilot power of the second symbol and other symbols within the first time slot.

16. The non-transitory computer readable media of claim 15 further comprising:
increasing a number of pilot sub-carriers for the first symbol in lieu of increasing the pilot power of the first symbol.

17. The non-transitory computer readable media of claim 15, wherein said determining whether a first time slot of one transmission protocol is adjacent to a second time slot of another transmission protocol further comprises:
determining whether a first time slot of a broadcast transmission is adjacent to a second time slot of a unicast transmission.

18. The non-transitory computer readable media of claim 17, wherein the broadcast transmission comprises an Enhanced Multimedia Broadcast/Multicast Service (E-MBMS) transmission.

19. The non-transitory computer readable media of claim 15, wherein said first and second symbol comprise an Orthogonal Frequency Division Multiplexing (OFDM) symbol.

20. The method of claim 1, further comprising:
performing channel estimation on the first symbol having an increased pilot power.

* * * * *